United States Patent [19]

Izawa et al.

[11] 4,185,271
[45] Jan. 22, 1980

[54] CHARACTER READING SYSTEM

[75] Inventors: Koji Izawa, Yokohama; Kouichi Komatsu, Ayase; Mitsuyoshi Okamura, Yokohama, all of Japan

[73] Assignee: Tokyo Shibaura Denki Kabushiki Kaisha, Kawasaki, Japan

[21] Appl. No.: 947,574

[22] Filed: Oct. 2, 1978

[30] Foreign Application Priority Data

Oct. 3, 1977 [JP] Japan .................. 52-117876

[51] Int. Cl.$^2$ .............................................. G06K 9/12
[52] U.S. Cl. ................. 340/146.3 AG; 340/146.3 MA
[58] Field of Search ............. 340/146.3 AG, 146.3 H, 340/146.3 R, 146.3 MA

[56] References Cited

U.S. PATENT DOCUMENTS

| | | | |
|---|---|---|---|
| 3,593,283 | 7/1971 | Miyamoto et al. | 340/146.3 MA |
| 3,644,890 | 2/1972 | Matthews | 340/146.3 AG |
| 3,688,266 | 8/1972 | Watanabe et al. | 340/146.3 MA |
| 3,737,855 | 6/1973 | Cutaia | 340/146.3 AG |
| 3,973,239 | 8/1976 | Kakumoto et al. | 340/146.3 AG |
| 4,074,231 | 2/1978 | Yajima et al. | 340/146.3 AG |

*Primary Examiner*—Leo H. Boudreau
*Attorney, Agent, or Firm*—Oblon, Fisher, Spivak, McClelland & Maier

[57] ABSTRACT

The character reading system is provided with a pretreating system for a pattern recognition and a picture translation wherein a pattern signal obtained by scanning a character pattern on a recording medium is processed at such high threshold level that does not contain a noise component to form a primary kernel pattern, and the pattern signal is processed at such low threshold level that contains said character pattern to obtain a reference pattern. The kernel pattern and the reference pattern are masked on a memory device to have predetermined size and subjected to connecting operation when they are read out by forward scanning to form a connected secondary kernel pattern. The secondary kernel pattern and the reference pattern are masked to have predetermined size and then reversely scanned to subject both patterns to the second connecting operation thereby producing a last kernel pattern.

10 Claims, 23 Drawing Figures

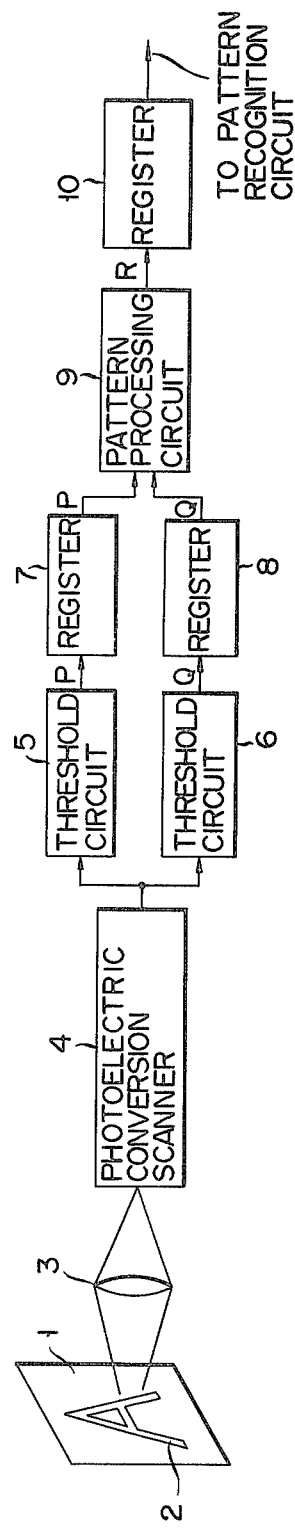
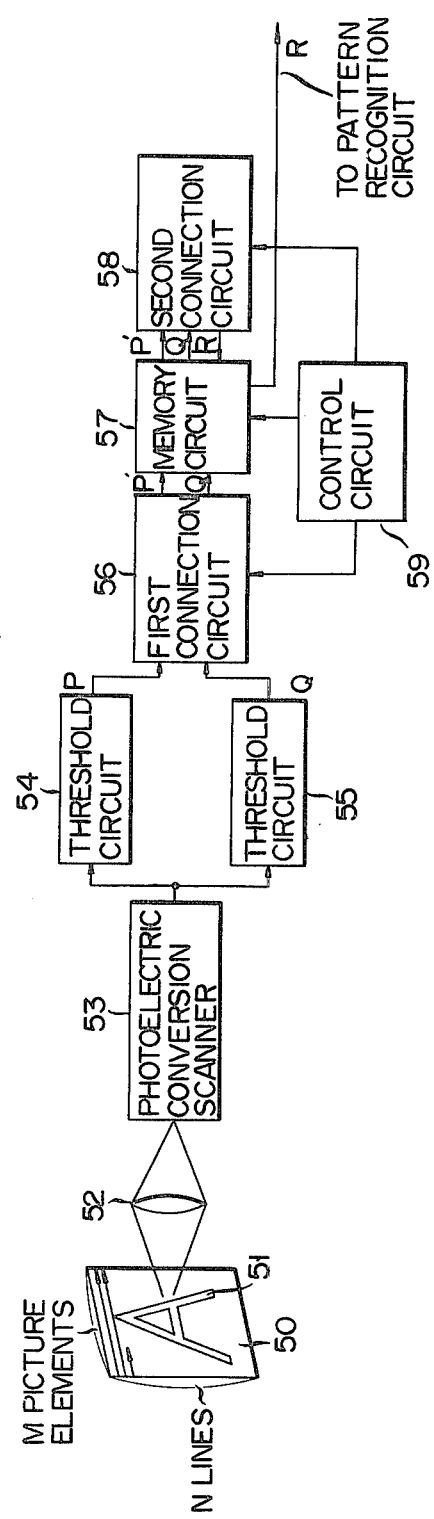

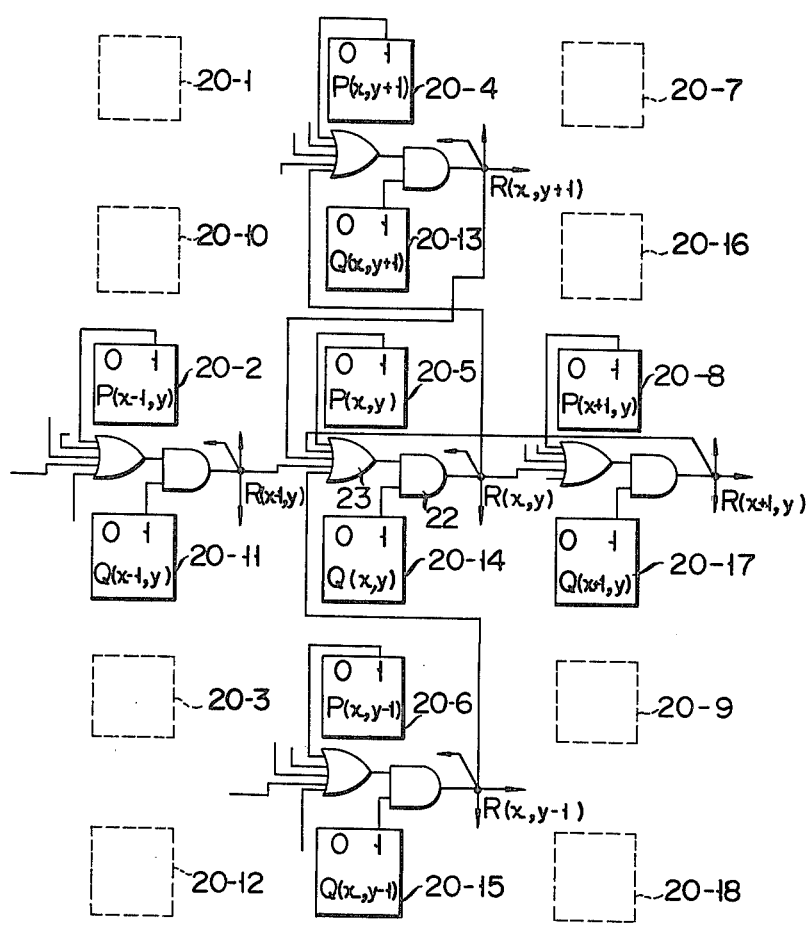

| | y+2 | y+1 | y | y−1 | |
|---|---|---|---|---|---|
| | P'(x-1,y+2) | P'(x-1,y+1) | P'(x-1,y) | P'(x-1,y-1) | x−1 |
| | P(x,y+2) | P(x,y+1) | P(x,y) | P'(x,y-1) | x |
| | Q(x-1,y+2) | Q(x-1,y+1) | Q(x-1,y) | Q(x-1,y-1) | x−1 |
| | Q(x,y+2) | Q(x,y+1) | Q(x,y) | Q(x,y-1) | x |

| y+2 | y+1 | y | y−1 | |
|---|---|---|---|---|
| A | C | J | — | x−1 |
| B | I | P(x,y) | — | x |
| D | F | H | — | x−1 |
| E | G | Q(x,y) | — | x |

| A | B | C | D | E | F | G | H |
|---|---|---|---|---|---|---|---|
|   |   | 1 |   |   |   |   | 1 |
|   |   | 1 |   |   |   | 1 |   |
|   | 1 |   |   |   |   | 1 |   |
|   | 1 |   | 1 |   | 1 |   | 1 |
|   | 1 |   | 1 |   | 1 | 1 |   |
| 1 |   |   |   |   |   | 1 | 1 |
| 1 |   |   |   |   |   | 1 |   |
| 1 |   |   |   | 1 |   | 1 |   |

| A | B | C | D | E | F | G | H | I | J | P'(x,y) |
|---|---|---|---|---|---|---|---|---|---|---------|
| * | * | * | * | * | * | * | * | 1 | * | 1 |
| * | * | * | * | * | * | * | * | * | 1 | 1 |
| * | * | 1 | * | * | * | * | 1 | * | * | 1 |
| * | * | 1 | * | * | * | 1 | * | * | * | 1 |
| * | 1 | * | X | * | * | 1 | * | * | * | 1 |
| * | 1 | * | 1 | * | 1 | * | 1 | * | * | 1 |
| * | 1 | * | 1 | * | 1 | 1 | * | * | * | 1 |
| 1 | * | * | * | * | 1 | * | 1 | * | * | 1 |
| 1 | * | * | * | * | 1 | 1 | * | * | * | 1 |
| 1 | * | * | * | 1 | * | 1 | * | * | * | 1 |

CHARACTER READING SYSTEM

BACKGROUND OF THE INVENTION

This invention relates to a character reading system, and more particularly, to a preprocessing system for pattern recognition, and picture translation.

Generally, the percentage of error in the reading of a character reading system is influenced by the quality of the character pattern on a recording medium.

In mechanically printed or hand written characters, a portion of the character line becomes blurred or lost due to such causes as unsatisfactory type surface condition, non-uniform printing, non-uniform inking, improper writing instruments, irregularity of the surface of the paper or the like. Even where the character lines are not blurred, when the contrast thereof with respect to the linear portions of the character is low due to a low percentage of the reflection of the paper, small contrast signals generated by a photoelectric converting circuit utilized to convert character patterns into electric signals will be lost by noises with the result that the character pattern will be detected as blurred patterns.

For the purpose of interpolating blurred or discontinuous character lines it has been proposed to compare contrast information of a point included in the pattern and that of nearby points for the purpose of judging whether a central point is on the character line or not depending upon whether the nearby point has a predetermined contrast difference from a predetermined threshold level or not. Such judgement means examination of the contrast of the character line. With this method however, non-uniform contrast of the character line will be judged as a blur or discontinuity of the character line or where a faint dirty spot is present on a portion other than the character, a contrast will be detected showing the dirty spot as a black spot. For this reason, with this method, it is necessary to use a proper expedient which prevents the faint dirty spot from being detected as a black spot whereas a character line having a low concentration is detected as a black line.

According to another method, the threshold level which is used to judge the contrast difference is made variable so that the threshold level is normally set to a definite level for effecting identification whereas when the character line is blurred, the threshold level is decreased but increased for character lines having higher concentration thereby effecting accurate identification.

The second method has a similar difficulty as in the first method. More particularly, where the threshold level is decreased for the purpose of judging character lines having a low contrast, even a faint dirty spot of the paper would be judged as a black spot whereas when the threshold level is increased the character line would be judged as discontinuous.

As disclosed in U.S. Pat. No. 3,688,266 we have proposed a character reading system capable of eliminating the defects described above wherein two types of patterns, that is a kernel pattern P having a high threshold level and a reference pattern Q having a low threshold level are used for the purpose of positively detecting only the characters but not detecting faint dirty spots other than the characters.

As shown in FIG. 1, according to this system, a character 2 on a recording medium 1 is scanned by a scanning device 4 through an optical system 3, and the contrast signals at various cross points of column lines and row lines which cover the character pattern are passed through a first threshold circuit 5 having a high threshold level A for discriminating two values of white and black, and a second threshold circuit 6 having a low threshold level for discriminating two levels of white and black and a kernel pattern P obtained by the first threshold circuit 5 and a reference pattern Q obtained by the threshold circuit 6 are temporarily stored in two dimensional registers 7 and 8 respectively. Then, in a pattern processing circuit 9, continuous character lines are obtained from patterns P and Q by interpolating the discontinuous portions of the character lines of the pattern P with the pattern Q thereby forming a character pattern R from which black spots caused by dirty spots other than the character lines have been eliminated. The character pattern R is then stored in a two dimensional register 10 as a normal character reading pattern.

According to this system, since the character pattern R is formed by extracting only the character portion, it is possible to obtain a character reading system which can operate stably and permits relatively high allowance for the quality of printing. In other words, this system can accurately read characters of poor printing quality.

However, this system still involves a number of problems to be solved. One problem is that the circuit wiring for performing the connecting operation is extremely complicated and the second problem is that the time required for the connecting operation is long.

These problems will be described briefly in the following.

The two dimensional registers 7 and 8 and the pattern processing circuit 9 shown in FIG. 1 were constructed as shown in FIG. 2. In FIG. 2, (20-1)~(20-9) represent memory elements (flip-flop circuits, for example) for storing the white and black states of the picture elements of the pattern P whereas (20-10)~(20-18) represent the memory elements for storing the white and black states of the picture elements of the pattern Q. Although in FIG. 2, only 9 memory elements are shown for storing patterns P and Q respectively, actually, these memory elements are arranged in a matrix of M×N (for example, 128×128). Information of the memory elements P(x,y) and Q(x,y) corresponding to a position (x,y) of the two dimensional registers 7 and 8 determines the white and black states of a memory element R(x,y). Considering a case of determining the white and black states of the memory element R(x,y) with reference to FIG. 2, the memory element R(x,y) is determined by the output of an AND gate circuit 22 which is supplied with the output of the memory element Q(x,y) and the output of an OR gate circuit 23. The OR gate circuit 23 is supplied with the output signals of the memory units P(x,y), R(x+1, y), R(x, y−1), R(x−1, y) and R(x, y+1). Accordingly, where the content of the memory element Q(x,y) is "1" (that is black) when the character is detected with the low threshold level, and at content of P(x,y) and the contents that is the contents of R(x+1, y), R(x, y−1), R(x−1, y) and R(x, y+1) of four points surrounding R(x,y) are "1" (that is black) where the character is detected with the high threshold level, the memory element R(x,y) is determined as "1" (that is black). Such judgement is made throughout the pattern and the resulting pattern R is stored in a two-dimension register (register 10 shown in FIG. 1) having M×N bits (for example, 128×128).

As can be noted from the foregoing description since the circuits (AND gate circuit 22 and the OR gate circuit 23) for effecting the connecting operation are provided throughout the pattern between M×N memory elements adapted to store the pattern P and M×N memory elements adapted to store the pattern Q, the wiring of the connecting operation circuit is extremely complicated and bulky, thus increasing the size of the apparatus.

In the prior art processing system shown in FIGS. 1 and 2, the result of processing which is performed throughout the pattern by using the complicated connecting operation circuit described above is once stored in M×N memory elements provided for storing the pattern R, and after the connecting operation of the entire pattern has been completed the contents of the M×N memory elements which store the pattern R are sequentially read out. As can be noted from FIG. 2, the connecting operation of one point (x,y) influences all other points, so that connecting operation of that point (x,y) is completed only when the connecting operations throughout the pattern have been completed. For this reason, until the connecting operation of the entire pattern has been completed, it is impossible to derive out the contents of the memory elements which are storing the pattern R with the result that it was impossible to improve the processing speed of the character reading apparatus. Especially, where the longitudinal dimension of the pattern is large, the connecting operation requires a long time, so that where the patterns continue infinitely in the longitudinal direction, the connecting operation would never terminate. For this reason it has been desired to provide a more efficient connecting operation system than that shown in FIGS. 1 and 2.

SUMMARY OF THE INVENTION

Accordingly, it is an object of this invention to provide an improved character reading system having a simple connecting operation circuit which can process the connection in a shorter time but with substantially the same accuracy as the operation circuit shown in FIG. 2.

According to this invention, there is provided a character reading system comprising means for scanning a character patterns on a recording medium to obtain an electric signal corresponding to the contrast of the character pattern, a first threshold circuit having a high threshold level to process an input pattern signal such that a noise component is not contained so as to obtain a kernel pattern P, a second threshold circuit having a low threshold level to process the input pattern signal such that the character portion is positively included so as to obtain a reference pattern Q, a first masking means for applying a mask of a predetermined size to the kernel pattern P and the reference pattern Q obtained by the first and second threshold circuits respectively, means for performing a first connecting operation by a forward scanning by using the kernel pattern and the reference pattern in a mask obtained by the masking means, means for writing and storing a kernel pattern P' subjected to said connecting operation and said reference pattern Q, means for reading out in the opposite direction the kernel pattern P' and the reference pattern Q stored in the storing means, a second masking means for applying a mask having a predetermined size to the read out kernel pattern P' and the reference pattern Q, means for effecting a second connecting operation with a reverse scanning by using the kernel pattern P' and the reference pattern Q in a mask obtained by the second masking means, and means for finally connecting kernel patterns subjected to the second connecting operation to produce an output.

BRIEF DESCRIPTION OF THE DRAWINGS

The principle of construction and operation of the character reading system of this invention can be more fully understood from the following detailed description taken in conjunction with the accompanying drawings in which:

FIG. 1 is a block diagram showing a prior art character reading system;

FIG. 2 is block diagram showing the detail of the pattern processing circuit shown in FIG. 1;

FIGS. 4A and 4B show examples of the masks utilized in this invention;

FIG. 5 is a block diagram showing one example of the character reading system according to this invention;

DETAILED DESCRIPTION OF THE PREFERRED EMBODIMENT

Figure 3A:
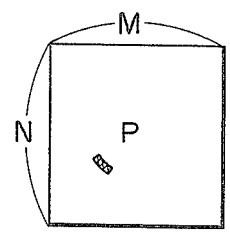
FIGS. 3A~3G are schematic views useful to explain the principle of the connecting operation of the character reading system embodying the invention.
Figure 3B:
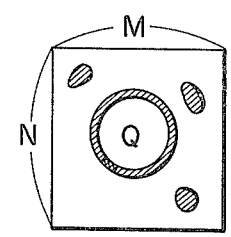
Figure 3C:
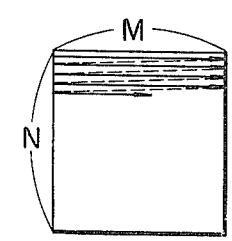
Figure 3D:
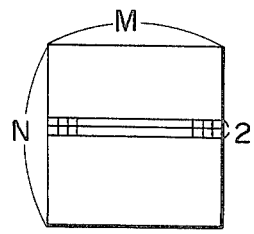
Figure 3E:
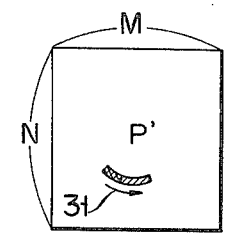
Figure 3F:
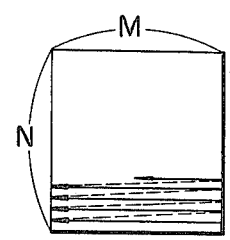
Figure 3G:
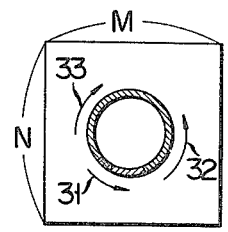

FIGS. 3A through 3G show the principle of the connecting operation performed by the character reading system of this invention. FIG. 3A shows a kernel pattern P which is detected with a high threshold level A so as not to contain any noise, whereas FIG. 3B shows a reference pattern Q which is detected with a low threshold level B so as to include a character. When the kernel pattern P and the reference pattern Q are given, the patterns P and Q are sequentially read out with a scanning system shown in FIG. 3C to judge the connection in a mask of M×2 shown in FIG. 3D thereby rewriting the kernel pattern P to obtain a kernel pattern P' as shown in FIG. 3E. Then the patterns P' and Q are sequentially read out by scanning them in the opposite direction as shown in FIG. 3F to perform the same connection judging operation. Then, a final output pattern R shown in FIG. 3G can be obtained which contains only the character shown in FIG. 3B.

In FIGS. 3A, B, E and G, cross-hatched portions show the position of the kernel pattern P. By the first connecting operation the pattern is formed in a direction shown by an arrow 31 shown in FIG. 3E and by the second connecting operation, the pattern is formed in the direction shown by arrows 32 and 33 shown in FIG. 3G.

We have found the above described principle of connection and confirmed by experiments that the connecting operation can be accomplished throughout the pattern having a size of M×N where the connection judgement is made within a mask of M×2. More particularly, the fact that after effecting the connecting operation by forwardly scanning in a mask of M×2, the connecting operation of the entire pattern of M×N by the scanning in the opposite direction means that the connecting operation can be completely performed for a pattern of M×N/2 or M×N/3. For example, when the pattern has a size of 128×128 bits the pattern is equally divided in the longitudinal direction into four patterns each having 128×32 bits. The connecting operation is performed for the first pattern having 128×32 bits by scanning it in the forward and reverse directions, the next pattern having 128×32 bits is processed in the same manner and so on. The connection judgement can be made in a mask of 128×2, before completion of the connection operation of the entire pattern of 128×128 bits it is possible to send the result of the connection judgement to the succeeding stage (for example, an identifying circuit) when the connecting operation of each pattern having 128×32 bits has been completed. Consequently, it is possible to greatly improve the processing speed.

As above described the connecting operation of this invention requires two operations, that is a first connecting operation utilizing forward scanning and a second connecting operation utilizing reverse scanning.

FIGS. 4A and 4B show examples of the masks utilized for the connecting operation according to this invention. Thus, in this invention, the mask for the kernel pattern P (or P') and the mask for the reference pattern Q have smaller lateral dimensions than M×2. (In FIGS. 4A and 4B masks of 4×2) Considering the principle, in order to perform correct connecting operation of a pattern of M×N, the pattern should have a size of at least M×2, as can be noted from the foregoing description. However, where the construction of the pattern (character) to be read is not complicated, it was found by an experiment that a mask having a size of 4×2 can be processed without any appreciable problem, so that in this example a mask having a size of 4×2 is used. However, it should be understood that the size of the mask is not limited to 4×2 and that various sizes of masks, that is 5×2, 5×3—are required depending upon the construction of the input pattern. When a small size mask is used for an input pattern having a complicated construction, it is impossible to perform correct connecting operation. Considering these points, the mask should have a size sufficient to perform the connecting operation without any trouble of a given input pattern in accordance thereof, and it is one of the important features of this invention that an input pattern is masked with a mask having a given size.

FIG. 4A shows a masked kernel pattern in which patterns designated by P' shows secondary kernel patterns which were obtained by performing the first pattern connecting operation of the primary kernel pattern P by utilizing a reference pattern, and show a state in which the pattern connecting operation of the kernel pattern P(x,y) is to be made subsequently. FIG. 4B shows a masked reference pattern Q having a constant level before and after the connecting operation of the kernel pattern. To determine the secondary kernel pattern P'(x,y) from the primary kernel pattern (P(x,y), the prior art connecting circuit shown in FIG. 2 is used. Thus, the pattern data shown in FIGS. 4A and 4B are applied to the positions of patterns P and Q shown in FIG. 2 and the logical operations are performed with the circuit shown in FIG. 2.

Where 4×2 masks shown in FIGS. 4A and 4B are used the judgement of the first connection is made according to the following logical equations;

$$P'(x,y) = P(x,y) + Q(x,y) \cdot [P(x,y-1) + P(x-1,y) + \\ P(x,y+1) + P(x-1,y-1) \cdot \{Q(x,y-1) + \\ Q(x-1,y)\} + P(x-1,y+1) \{Q(x-1,y) + \\ Q(x,y+1)\} + P(x-1,y+2)\{Q(x-1,y+1) \cdot \\ (Q(x-1,y) + Q(x,y+1)\} + Q(x,y+1) \cdot Q(x,y+2)\} - \\ P(x,y+2) \{Q(x,y+1) + Q(x-1,y+1) \cdot Q(x-1,y+2) \\ (Q(x-1,y) + Q(x,y+1))\}] \quad (1)$$

when P'(x,y−1), P'(x−1,y), P'(x−1,y−1), P'(x−1,y+1) and P'(x−1,y+2) shown the values of P(x,y−1), P(x−1,y) P(x−1,y−1), P(x−1,y+1) and P(x−1,y+2) which have been rewritten by the connecting operation concerning immediately preceeding scanning line.

When the second connecting operation is performed by repeating the connecting operation according to this logic by the reverse scanning, the desired pattern R(x, y) can be obtained.

FIG. 5 shows one example of the character reading system of this invention in which a character 51 recorded on a recording medium or paper 50 is scanned by a scanning device 53 through an optical system 52 to produce a character pattern contrast information which is applied to a first threshold circuit 54 having a high threshold level to discriminate white and black and to a second threshold circuit 55 which operates at a low threshold level.

The output patterns of threshold circuits 54 and 55 are supplied to the first connection circuit 56 which is used to perform the first connecting operation shown in FIG. 3E. More particularly, the pattern P obtained by the threshold circuit 54 and the pattern Q obtained by the threshold circuit 55 are subjected to the connecting operation with 4×2 masks shown in FIGS. 4A and 4B.

Figure 6:
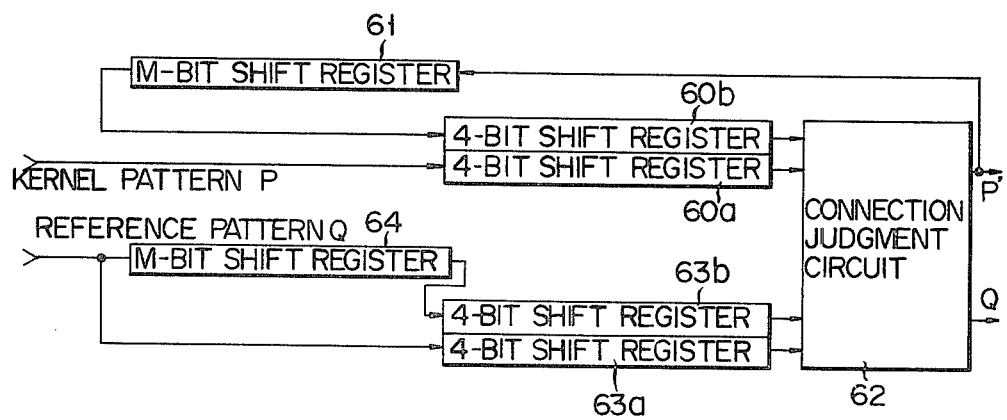
FIG. 6 is a block diagram showing one example of the first connection circuit shown in FIG. 1.

FIG. 6 shows the detail of the first connection circuit 56. In this example, it comprises 4-bit shift registers 60a and 60b. The shift register 60a is supplied with pattern P whereas shift register 60b is supplied through M bit (128 bits) shift register 61 with a pattern P' which was obtained by the connecting operation of one line before. The outputs of the 4-bit shift registers 60a and 60b are applied to a connection judgement circuit 62.

The pattern Q is supplied directly to the 4-bit shift register 63a and to the 4-bit shift register 63b via M bit (128 bits) shift register 64 and the outputs of these shifts registers are applied to the connection judgement circuit 62.

Figure 7:
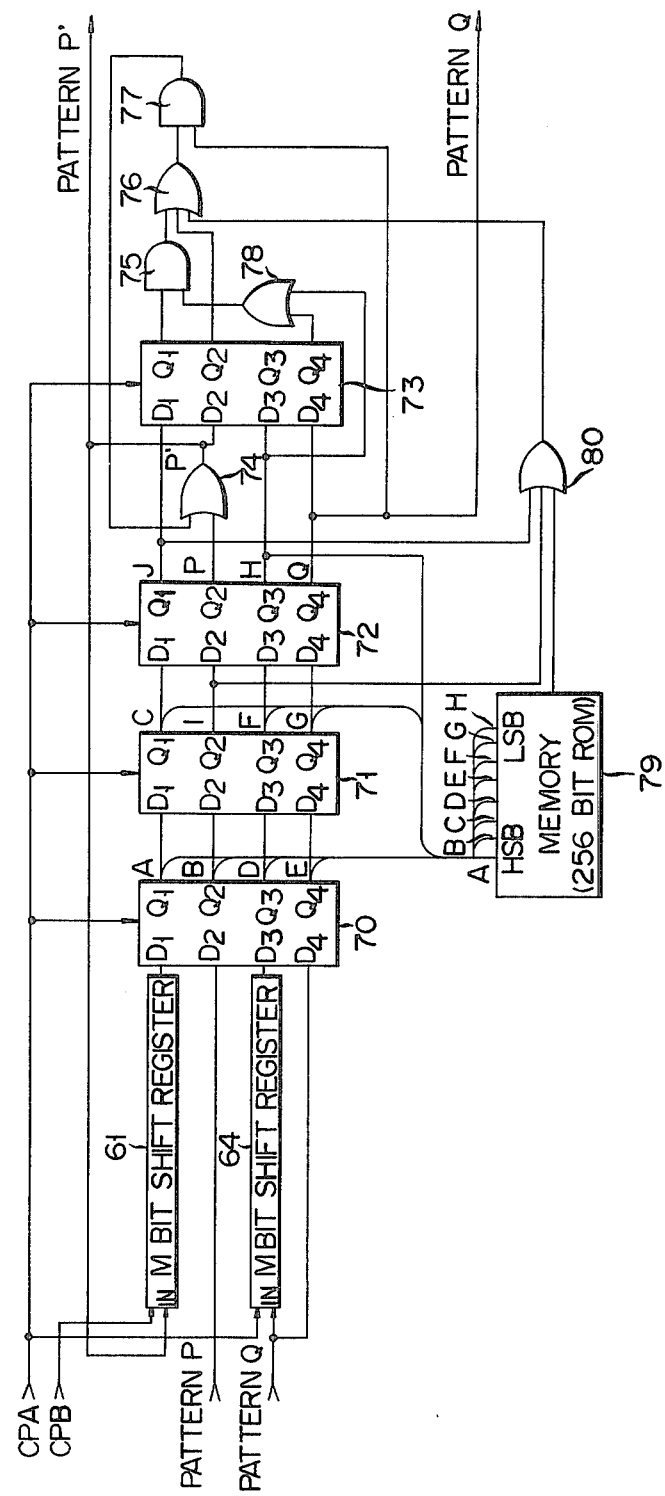
FIG. 7 is a block diagram showing the detail of the first connection circuit shown in FIG. 5.
Figures 8, 9A, 9B, 10:
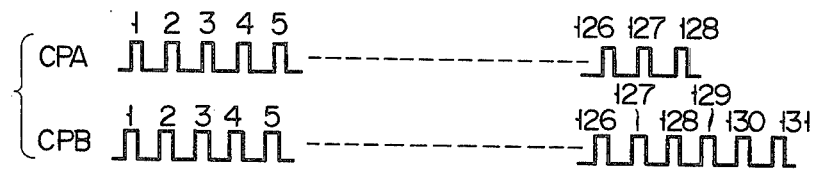
FIG. 8 shows clock pulses for shifting the contents of the shift registers shown in FIG. 7.
FIGS. 9A and 9B show the data utilized for the connecting operation.
FIGS. 10 and 11 are graphs useful to explain the connection judgement.

FIG. 7 shows the detail of the first connection circuit 56 shown in FIG. 6. The first connection circuit 56 comprises registers 70~73 each for 1 bit−4 lines. The first horizontal lines of these registers correspond to the 4-bit shift register 60b shown in FIG. 6, and the second, third and fourth horizontal lines correspond to the 4-bit shift registers 60a, 63b and 63a respectively. CPA and CPB represent clock signals applied to respective shift registers and as shown in FIG. 8, clock signals CPA and CPB comprise 128 and 128+3 pulses respectively. The reason that the clock signal CPB comprises 131 pulses is that the input of the M bit shift register 61 is the pattern P' which circulates through shift registers 70~72 having a total bit of 131.

With this construction, four 4-bit shift registers 60b, 60a, 63b, 63a store informations regarding respective picture elements in a state as shown in FIG. 9A. Thus, the order of information is opposite to that shown in FIGS. 4A and 4B because FIGS. 4A and 4B show the array of patterns while FIG. 9A shows the result of scanning.

To simplify the description, FIG. 9A is rewritten as shown in FIG. 9B. More particularly, (A) (B) (D) and (E) shown in FIG. 9B respectively correspond to P ('−1,y+2), P(x,y+2), Q(x−1,y+2) and Q(x,y+2). These (A) through (J) correspond to the outputs (A)~(J) respectively of the registers 70 through 72.

Turning back again to FIG. 7, the operation of the connection judgement circuit 62 shown in FIG. 6 will be described.

In FIG. 7, OR gate circuit 74, AND gate circuit 75, OR gate circuit 76, AND gate circuit 77, OR gate circuit 78, memory device (256 bit ROM) 79 and OR gate circuit 80 constitute the connection judgement circuit.

When the output P(x,y) of the $Q_2$ terminal of shift register 72 is "1", the output P' (x,y) of the OR gate circuit 74 becomes "1". Thus, when P(x,y) is black, P'(x,y) is also black. When the output P'(x−1,y−1) of the $Q_1$ terminal of shift register 73 is "1" and when either one of the output Q(x−1,y) of the $Q_3$ terminal of the shift register 72 and the output Q(x,y−1) of the $Q_4$ terminal of the shift register 73 is "1", the output of the AND gate circuit 75 is "1". The output signals A,B, C,D,E,F,G and H of the shift registers 70, 71 and 72 are supplied to the memory device 79 to judge whether predetermined ones of A~H are "1" or not. In other words, the content of the memory device 79 is read out by using signals A~H as address signals. The content of the memory device 79 is shown by FIG. 10, and the memory device produces "1" only when the address shown by "1" in FIG. 10 are "1" but produces "0" when these condition are not satisfied.

The output of the memory device 79, the output P(x,y+1) of the terminal $Q_2$ of the shift register 71 and the output P'(x−1,y) of the terminal $Q_1$ of the shift register 72 are applied to the OR gate circuit 80 and its output, the output of the AND gate circuit 75, and the output P'(x,y−1) of the $Q_2$ terminal of the shift register 73 are applied to the OR gate circuit 76. The output of this OR gate circuit, and the output Q(x,y) of the $Q_4$ terminal of the shift register 72 are applied to the AND gate circuit 77. The output of this AND gate circuit 77 is applied to the OR gate circuit 74.

Consequently, when Q(x,y) is "1" and the output of the OR gate circuit 76 is "1", the output of the AND gate circuit 77 becomes "1" and the output P'(x,y) of the OR gate circuit 74 becomes "1".

To make "1" the output of OR gate circuit 76, either one of the output of AND gate circuit 75, the output P'(x,y−1) of the $Q_2$ terminal of shift register 73 and the output of OR gate circuit 80 should be "1".

Figures 11, 13:
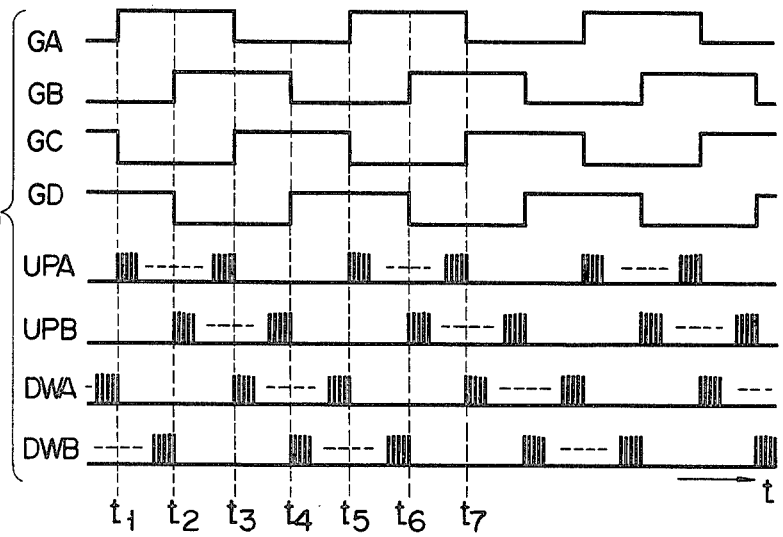
FIG. 13 is a chart showing the timing of the various control signals shown in FIG. 12.

The condition that makes "1" the output of OR gate circuit 80, that is that makes "1" the output P'(x,y) when the output of AND gate circuit 77 is "1", is shown in FIG. 11, in which symbol * shows that the outputs may be either 37 0" or "1". As can be noted from this figure, where I or J is "1", P'(x,y) becomes "1" irrespective of whether A~H are "1" or "0". Where I and J are "0", P'(x,y) becomes "1" only when the condition shown in FIG. 10 is satisfied.

The condition and the circuit that makes "1" the output P'(x,y) satisfy equation 1.

By the first connecting operation described above, patterns P' and Q are applied to the memory circuit 57 shown in FIG. 5.

Figure 12:
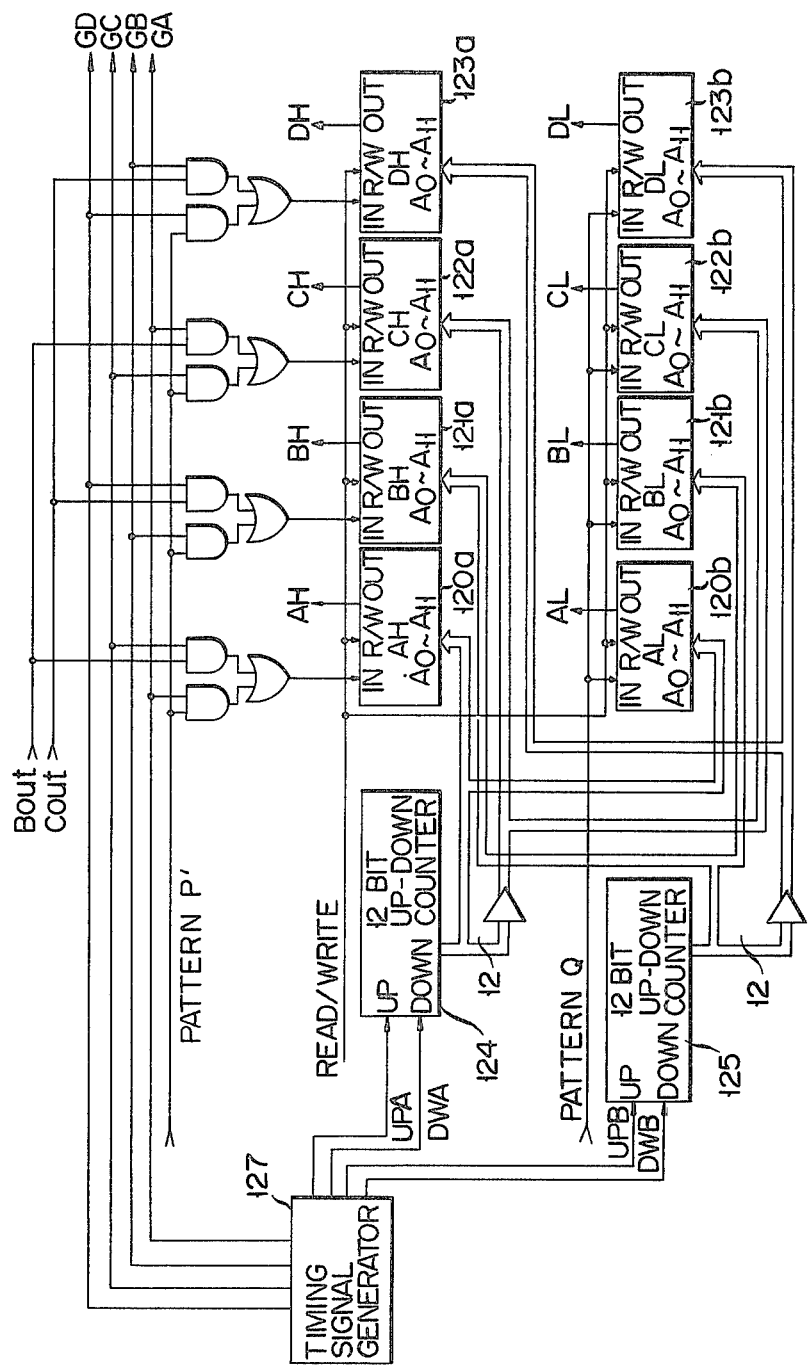
FIG. 12 is a block diagram showing the detail of a portion of the memory circuit and the control circuit shown in FIG. 5.

FIG. 12 shows the detail of the memory circuit 57 shown in FIG. 5. For the sake of description, a control circuit 59 is also shown in FIG. 12.

Each of 120a, 120b, 121a, 121b, 122a, 122b, 123a and 123b shows a memory device incorporated with a 4K RAM having M bits and 1 lines (for example 128 bits and 32 lines), and each RAM is addressed by a 12-bit (A0~A11) signal.

Elements 124 and 125 are 12 bit up-down counters. The outputs of these counters are used as the address signal of the memory devices. Thus, the 12-bit output of the up-down counter 124 is used as the address signal A of the memory devices 120a and 120b, whereas the inverted output of the up-down counter 124 is used as the address signal B of the memory devices. In the same manner, the output of the up-down counter 125 used as the address signal C of the memory devices 121a and 121b, while the inverted output of the up-down counter 125 is used as the address signal D of the memory devices 123a and 123b.

Patterns P' and Q are applied to the memory circuit constructed as above described. More particularly, the pattern P' is applied to the memory devices 120a, 121a, 122a and 123a of the memory circuit under the control of control signals GA, GB, GC, GD, $B_{OUT}$ and $C_{OUT}$, whereas the pattern Q is supplied directly to memory devices, 120b, 121b, 122b and 123b.

FIG. 13 shows the timing relationship among control signals GA, GB, GC and GD and the clock signals UPA, UPB, DWA and DWA for the up-down counters 124 and 125. As shown in FIG. 13, control signals GA, GB, GC and GD have a phase difference of ¼ period. In the same manner, clock pulses UPA, UPB, DWA and DWB have a phase difference of ¼ period. Considering an interval $t_1$~$t_3$ under these control conditions GA is ON, and UPA is also generated. Accordingly, the up-down counter 124 operates to produce address signals A and B having opposite phases, the former corresponding to the forward scanning while the latter to the reverse scanning.

Consequently, the portions of pattern P' corresponding to 32 lines are written into the memory device 120a and the portions of pattern Q corresponding to 32 lines are written into the memory device 120b by the signal GA and the address signal A. Since address signal B is applied to the memory devices 122a and 122b, the data of the portions of the patterns P' corresponding to 32 lines that have been stored in the memory device 122a and the data of the portions of the patterns Q corresponding to 32 lines that have been stored in the memory device 122b are read out through OUT terminal in the opposite direction and then sent to succeeding stages (the second connection circuit to be described later). This reading out in the reverse direction (that is reverse scanning) is the second important feature of this invention.

Considering the interval $t_2$~$t_4$, the control signal GB and the clock signal UPB are ON during this interval. Accordingly, the up-down counter 125 produces address signals C and D. Thus, portions of the pattern P' corresponding to 32 lines are written into the memory device 121a while the portions of the pattern Q corresponding 32 lines are written into the memory device 121b. On the other hand, portions of the pattern P' corresponding to 32 lines that have been stored in the memory device 123a are read out of it and the portions of pattern Q corresponding to 32 lines that have been stored in the memory device 132b are read out of it. As can be noted from FIG. 13 signals GA and GB and signals UPA and UPB have a phrase difference of ¼ period. As a consequence, the portion in interval $t_2 \sim t_3$ of the data written into the memory devices 120a and 120b during $t_1 \sim t_3$ is also written into the memory devices 121a and 121b at the same time. The third feature of this invention lies in the writing or reading the data with one halves over-lapped. Thus, when the total area of the pattern occupies 128×128 bits, the pattern is processed by dividing it into four 128×32 sections, that is into four groups of 32 lines each. In such case near the boundary between the four sections, it is difficult to provide satisfactory connecting operation between the points at the boundary because of the shortage of the nearby points. For this reason, according to this invention, the sectionalized patterns are processed with one halves overlapped so that the information around the boundaries can be used for effecting the connecting operation of the points near the boundary.

Let us consider an interval $t_3 \sim t_5$ in which control signal GC and clock signal DWA are ON. By the application of the clock signal DWA to the up-down counter the signal A becomes an address signal for effecting the reverse scanning whereas signal B an address signal for effecting the forward scanning. Consequently, the content of the memory device 120a is read out while pattern R which has been subjected to the connecting operation by the reverse scanning action of the second connection circuit (to be described later) is written into the memory device 120a. Only the pattern Q is read out from the memory device 120b. On the other hand, the pattern P' is written into the memory device 122a and the pattern Q is written into the memory device 122b.

Consider now interval $t_4 \sim t_6$, in which the control signal GD and the block signal DWB are ON. Accordingly, during this interval the pattern P' stored in the memory device 121 a is read out. At the same time, the pattern R obtained by the second connecting operation is written into the memory device 121a, and the pattern Q is read out from the memory device 121b. On the other hand, the patterns P' and Q are written into the memory devices 123a and 123b respectively.

Each of the writing and reading is effected in terms of 128 bits and 32 lines with 16 lines overlapped.

Thereafter, the above described operation is repeated and the data in memory devices 120a, 121a, 122a and 123a are sequentially changed from the pattern P' obtained by the first connecting operation to the pattern R obtained by the second connecting operation, all in a unit of 128 bits and 32 lines. When the first and second connecting operation for 32 lines are over, the rewritten data corresponding to these 32 lines are sequentially send out to the succeeding stage (pattern recognition unit).

Figure 14:
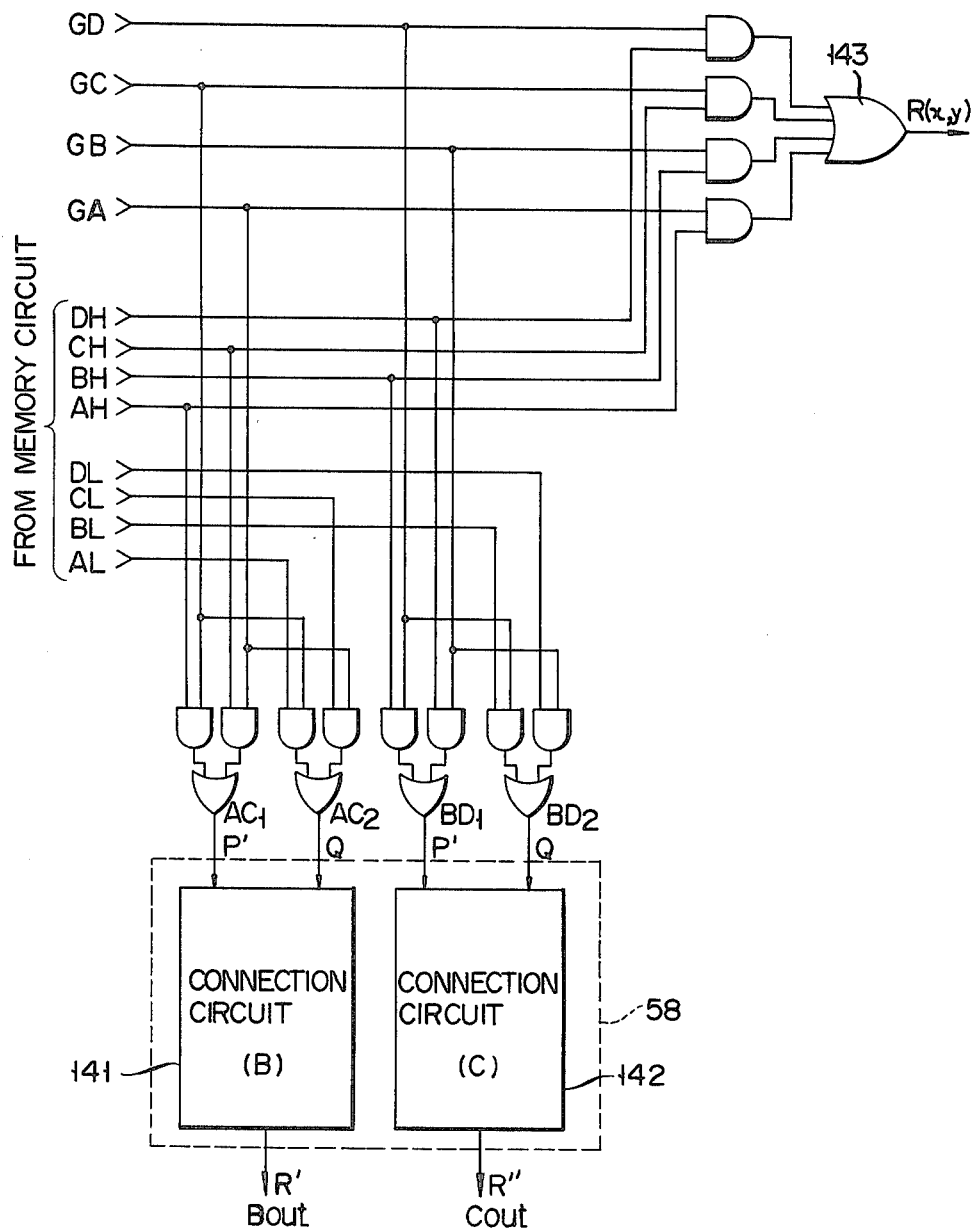
FIG. 14 is a block diagram showing the detail of a portion of the second connection circuit and the control circuit shown in FIG. 5.

FIG. 14 shows the detail of the second connection circuit 58 shown in FIG. 5, and a portion of the control circuit 59 for controlling the same. In this FIG. 141 and 142 represent circuits effecting the second connecting operation. The connection circuit B (141) subjects the patterns P' and Q respectively read out from the memory devices 120a and 120b, and the memory devices 122a and 122b shown in FIG. 12 to the second connecting operation while the connection circuit C(142) subjects the pattern P' and Q respectively read out from the memory devices 121a and 121b and the memory devices 123a 123b shown in FIG. 12 to the second connecting operation. The second processing circuit is divided into two circuits 141 and 142 because the data are read out from respective memory devices with each halve overlapped as has been described in connection with FIG. 13. By reading out the data with each halve overlapped and then subjecting them to the connecting operations of two connection circuits 141 and 142 the connecting operation can be made for all portions of the pattern without any interruption.

Each of the connection circuits B(141) and C(142) has the same construction as the first connection circuit 56 shown in FIG. 7. Accordingly, its detailed description will not be made. The connection circuit B(141) produces a kernel pattern R' as $B_{out}$ as a result of the connecting operation caused by the reverse scanning, whereas the connection circuit C(142) produces a kernel pattern R" as $C_{out}$ as a result of the connecting operation caused by the reverse scanning.

As shown in FIG. 14, the final output R(x,y) is produced by the OR gate circuit 143.

Figure 15:
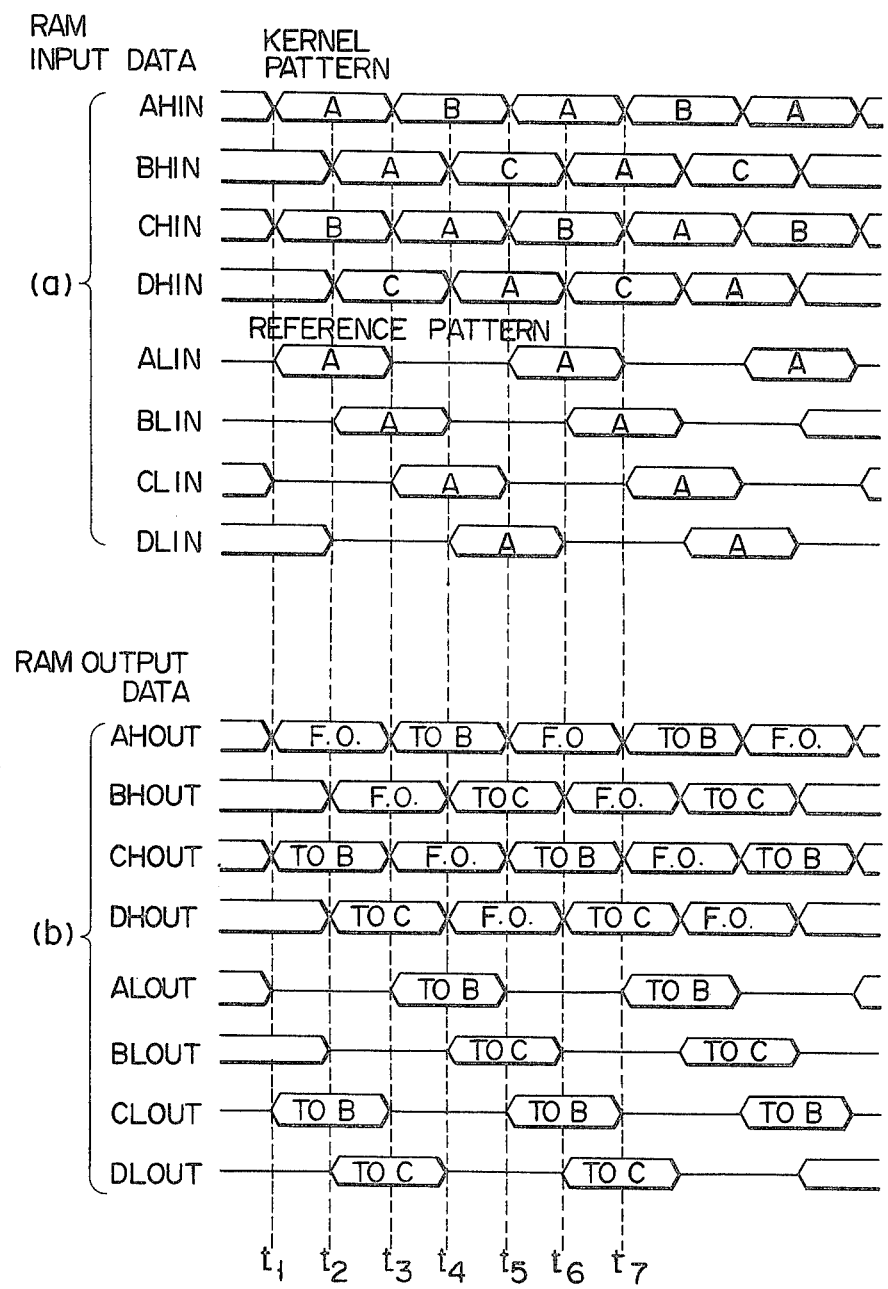
FIG. 15 is a diagram for explaining the manner of successively performing the connection.

FIG. 15 shows the proceeding of the two connecting operations described above with the time represented by the abscissa. Thus, FIG. 15(a) shows 8 input data to the RAM while (b) in FIG. 15 8 output data thereof.

In FIG. 15, AH, BH, CH, and DH represent memory devices 120a, 121a, 122a and 123a respectively, while AL, BL, CL, and DL memory devices 120b, 121b, 122b and 123b respectively. Times $T_1 \sim t_7$ are the same as those shown in FIG. 13. In FIG. 15(a), references A, B, C, show output A, output B and output C, respectively. In FIG. 15(b), reference F.O. represents a final output and TO B and TO C represent output to B and output to C, respectively.

FIG. 15(a) clearly shows the manner of writing the kernel pattern P' and the reference pattern Q obtained by the forward scanning at the time of the first connecting operation into respective RAMs with one halves overlapped and the manner of writting the kernel patterns R' and R" obtained by the reverse scanning at the time of the second connecting operation into respective RAMs with one halves overlapped. FIG. 15(b) clearly shows the manner of transferring the data of respective RAMs to the second connection circuits B and C with one halves overlapped and the manner of sending the data obtained by the second connecting operation.

As has been described in details according to this invention when subjecting pattern P to a connection processing by sequentially reading out the picture elements of a kernel pattern P obtained by a threshold circuit 54 having a high threshold level as well as the picture elements of a reference pattern Q obtained by a threshold circuit 55 having a low threshold level, the patterns P and Q are passed through a mask having a predetermined size sufficient to positively perform the connection processing of an input pattern so as to perform the first connecting operation by the forward scanning by using the data of a plurality of points extracted by the mask and then perform the second connection scanning by the reverse scanning. In the connecting operation with either forward or reverse scanning where the reference pattern Q(x,y) of a given point (x,y) is "1" (black), judgment is made whether the reference point of a plurality of points connected to the given point (x,y) is "1" or "0" (white). If there is a point whose reference pattern is "1", judgement is made whether the kernel pattern of that point is "1" or "0". If it is "1" the given point (x,y) is rewritten as "1".

Thus, according to this invention, the connection circuit is only required to perform the connecting operation of a masked pattern of a predetermined size (in this example 4×2 bits) so that the construction of the connection circuit is greatly simplified than the prior art connection circuit, thus reducing its size and cost of manufacturing.

Furthermore, according to this invention, a pattern having a size of M×N is divided into sections of a predetermined number, and the connecting operations (first and second connecting operations) are performed for the divided sections. Consequently, with regard to a section whose connecting operation has been finished, it is possible to send the result of its connecting operation to the succeeding stage. Thus, the defect of the prior art that until the connecting operations of the entire pattern surface are complete, it is impossible to send the result to the succeeding stage can be eliminated. For this reason it is possible to greatly improve the processing speed of the system.

Furthermore, when performing the connecting operation of divided sections of a pattern having a size of M×N, according to this invention, the connecting operation is performed with the divided sections partially overlapped in time. As a consequence, the connecting operation of the points near the boundary of the divided sections can also be effected positively.

The invention has the following additional advantages. According to this invention, when performing a connecting operation of a pattern having a predetermined size (in this embodiment 4×2 bits) which is extracted through a mask, the logic for the connection is prestored in a ROM. For this reason, the wiring necessary for the connecting operation is greatly simplified thus miniaturizing the apparatus.

What is claimed as new and desired to be secured by Letters Patent of the United States is:

1. A character reading system comprising means for scanning a character pattern on a recording medium to obtain an electric signal corresponding to the contrast of the character pattern; a first threshold circuit having a high threshold value to process an input pattern signal such that a noise component is not contained so as to obtain a kernel pattern P; a second threshold circuit having a low threshold value to process said input pattern signal such that the character portion is positively included so as to obtain a reference pattern Q; a first masking means for applying a mask of a predetermined size to said kernel pattern P and said reference pattern Q obtained by said first and second threshold circuits respectively; means for performing a first connecting operation by a forward scanning by using said kernel pattern and said reference pattern in a mask obtained by said masking means; means for writing and storing a kernel pattern P′ subjected to said connecting operation and said reference pattern Q; means for reading out in the opposite direction said kernel pattern P′ and said reference pattern Q stored in said storing means; a second masking means for applying a mask having a predetermined size to said read out kernel pattern P′ and said reference pattern Q; means for effecting a second connecting operation with a reverse scanning by using said kernel pattern P′ and said reference pattern Q in a mask obtained by said second masking means; and means for finally connecting kernel patterns subjected to said second connecting operation to produce an output.

2. The character reading system according to claim 1 wherein the mask utilized in said first and second masking means has a size of 4×2 bits.

3. The character reading system according to claim 1 wherein said first and second connecting operation means comprises means for detecting whether a reference pattern of a plurality of points connected to a given point (x,y) is black or white when the reference pattern of said given point (x,y) is black, said means detecting the kernel pattern of a black point thereby rewriting said point (x,y) to black, when said kernel pattern is black.

4. The character reading system according to claim 1 wherein said first and second connecting operations are executed in respective sections obtained by dividing said input pattern according to a predetermined number of lines.

5. The character reading system according to claim 1 wherein said first and second connecting operations are executed for a predetermined number of divided sections with portions thereof partially overlapped in time.

6. The character reading system according to claim 2 wherein said first and second masking means each having a mask of the size of 4×2 bits comprises a 4×2 bit shift register adapted to store said kernel pattern in a 4×2 bit region of said input pattern and a 4×2 bit shift register adapted to store said reference pattern in said 4×2 bit region.

7. The character reading system according to claim 1 wherein said first and second connecting operation means comprise logical memory means adapted to store a connection logic, and means for judging whether the bit information of said kernel pattern and said reference pattern which are derived out by said masking means coincide with the content of said memory means which stores said connection logic or not, said judging means producing a coincidence signal from said logic memory means when a coincidence is obtained.

8. The character reading system according to claim 1 wherein said means for storing the result of said first connecting operation comprises a plurality of memory devices for storing the kernel pattern P′ subjected to the first connecting operation and then divided into sections of a predetermined number, and a plurality of memory devices for storing said reference pattern Q divided into sections of said predetermined number.

9. The character reading system according to claim 1 which further comprises means which, while the content of a given memory device among a plurality of memory devices which store said kernel pattern and said reference pattern which have been subjected to the first connecting operation for the purpose of performing said second connecting operation is being read out by reverse scanning, writes the result of the first connecting operation into a given memory device among the other plurality of memory devices.

10. The character reading system according to claim 1 wherein said means for producing the result of the last connecting operation comprises means for rewriting the content of said memory means adapted to store the result of the first connecting operation to the result obtained by said connecting operation and means for reading out the rewritten content of said memory means.

* * * * *